(12) United States Patent
Herrig (10) Patent No.: US 11,920,322 B2
(45) Date of Patent: Mar. 5, 2024

(54) SYSTEMS AND METHODS FOR COUPLING AN IMPLEMENT TO A WORK VEHICLE

(71) Applicant: CNH Industrial America LLC, New Holland, PA (US)

(72) Inventor: Kenneth Herrig, Wichita, KS (US)

(73) Assignee: CNH Industrial America LLC, New Holland, PA (US)

( * ) Notice: Subject to any disclaimer, the term of this patent is extended or adjusted under 35 U.S.C. 154(b) by 1075 days.

(21) Appl. No.: 16/401,813

(22) Filed: May 2, 2019

(65) Prior Publication Data

US 2020/0347574 A1    Nov. 5, 2020

(51) Int. Cl.
*E02F 9/00* (2006.01)
*F16D 3/26* (2006.01)
*F16D 3/82* (2006.01)
*F16D 127/06* (2012.01)

(52) U.S. Cl.
CPC .............. *E02F 9/006* (2013.01); *F16D 3/26* (2013.01); *F16D 3/82* (2013.01); *F16D 2127/06* (2013.01); *F16D 2300/12* (2013.01)

(58) Field of Classification Search
CPC ..... E02F 3/3618; E02F 3/3636; E02F 3/3631; E02F 9/006
See application file for complete search history.

(56) References Cited

U.S. PATENT DOCUMENTS

| | | |
|---|---|---|
| 3,441,091 A | 4/1969 | Helling |
| 3,705,656 A | 12/1972 | Hunger et al. |
| 3,913,684 A | 10/1975 | Casey et al. |
| 4,150,504 A | 4/1979 | Asche |
| 4,153,117 A | 5/1979 | Freese |
| 4,286,674 A | 9/1981 | Noble et al. |
| 4,462,172 A | 7/1984 | Caron |
| 4,488,850 A | 12/1984 | Wernimont |
| 5,040,615 A | 8/1991 | Fletcher |
| 5,528,843 A | 6/1996 | Rocke |
| 5,857,825 A * | 1/1999 | Rice .......................... B60P 1/24 414/483 |

(Continued)

FOREIGN PATENT DOCUMENTS

| | | |
|---|---|---|
| EP | 0104302 | 4/1984 |
| FR | 1350332 | 1/1964 |

(Continued)

OTHER PUBLICATIONS

U.S. Appl. No. 16/401,807, filed May 2, 2019, Daniel Owen Seacat.

*Primary Examiner* — Gerald McClain
(74) *Attorney, Agent, or Firm* — Rickard K. DeMille; Rebecca L. Henkel; Peter K. Zacharias (57) ABSTRACT

A system to couple an implement to a work vehicle includes a first lock assembly coupled to an arm of the work vehicle. The first lock assembly includes a latch. The first lock assembly also includes a first hook and a second hook positioned on opposite lateral sides of the latch. The first lock assembly further includes a first actuator configured to drive rotation of the latch to trap a laterally-extending bar of the implement between a curved inner surface of the latch and respective curved bar-contacting surfaces of the first and second hooks to form a first connection that couples the implement to the work vehicle.

19 Claims, 8 Drawing Sheets

(56) References Cited

U.S. PATENT DOCUMENTS

| | | | |
|---|---|---|---|
| 6,241,455 B1 * | 6/2001 | Schupback | E02F 3/3631 37/468 |
| 6,301,811 B1 | 10/2001 | Gilmore, Jr. | |
| 6,332,747 B1 | 12/2001 | Lee | |
| 6,860,705 B1 | 3/2005 | Dietrich et al. | |
| 6,962,475 B2 | 11/2005 | Fatemi | |
| 7,331,749 B2 * | 2/2008 | Vachon | E02F 3/384 212/302 |
| 7,426,796 B2 | 9/2008 | Cunningham et al. | |
| 7,494,314 B2 | 2/2009 | Bares et al. | |
| 7,618,229 B2 | 11/2009 | Boling et al. | |
| 7,832,127 B2 | 11/2010 | Hill | |
| 8,240,970 B2 * | 8/2012 | Bricker | E02F 3/3663 37/468 |
| 8,408,862 B1 | 4/2013 | Westendorf | |
| 8,596,901 B1 | 12/2013 | Popp | |
| 8,646,545 B1 | 2/2014 | Elliott | |
| 8,821,104 B2 | 9/2014 | Yasuda et al. | |
| 9,334,623 B2 | 5/2016 | Billaud | |
| 10,195,913 B2 * | 2/2019 | Thompson | B60D 1/46 |
| 2010/0024412 A1 | 2/2010 | Hyodo et al. | |
| 2010/0071987 A1 | 3/2010 | Hyodo et al. | |
| 2010/0076652 A1 | 3/2010 | Hyodo et al. | |
| 2011/0313625 A1 | 12/2011 | Miller et al. | |
| 2012/0004814 A1 | 1/2012 | Hyodo et al. | |
| 2013/0119634 A1 * | 5/2013 | Camp | B62K 19/36 280/287 |
| 2014/0212846 A1 | 7/2014 | Miller et al. | |
| 2015/0020892 A1 | 1/2015 | Behr et al. | |
| 2015/0039187 A1 | 2/2015 | Friebel | |
| 2015/0081178 A1 | 3/2015 | Billaud et al. | |
| 2015/0266348 A1 * | 9/2015 | Hauler | B60D 1/52 280/505 |
| 2016/0108602 A1 | 4/2016 | Singh et al. | |
| 2017/0335540 A1 * | 11/2017 | Hill | E02F 3/3609 |
| 2018/0238015 A1 * | 8/2018 | Fey | E02F 9/265 |
| 2018/0238016 A1 | 8/2018 | Seacat et al. | |

FOREIGN PATENT DOCUMENTS

| | | | |
|---|---|---|---|
| JP | 56101402 A * | 8/1981 | |
| WO | 2008138932 | 11/2008 | |

* cited by examiner

SYSTEMS AND METHODS FOR COUPLING AN IMPLEMENT TO A WORK VEHICLE

BACKGROUND

The present disclosure relates generally to systems and methods for coupling an implement to a work vehicle.

Certain work vehicles (e.g., tractors, harvesters, skid steers) couple to implements configured to perform work. The implements may include blades, augers, backhoes, trenchers, buckets, rakes, brooms, grapples, or other suitable pieces of equipment. The implements may couple to the work vehicle to form one or more connections. However, the process of coupling the implements to the work vehicle to form the one or more connections may be time consuming and inefficient. Additionally, for work vehicles that use an arm to support the implements, forces may be transmitted from the implements to a chassis of the work vehicle through the arm. Unfortunately, a maximum force rating of the implements may be limited due to this arrangement.

BRIEF DESCRIPTION

In one embodiment, a system to couple an implement to a work vehicle includes a first lock assembly coupled to an arm of the work vehicle. The first lock assembly includes a latch. The first lock assembly also includes a first hook and a second hook positioned on opposite lateral sides of the latch. The first lock assembly further includes a first actuator configured to drive rotation of the latch to trap a laterally-extending bar of the implement between a curved inner surface of the latch and respective curved bar-contacting surfaces of the first and second hooks to form a first connection that couples the implement to the work vehicle.

In one embodiment, a system includes an implement with a laterally-extending bar and a pair of openings. The system also includes a work vehicle having a first lock assembly coupled to an arm of the work vehicle and a second lock assembly coupled to a frame of the work vehicle. The first lock assembly includes a latch and a first actuator configured to drive rotation of the latch to engage the laterally-extending bar of the implement to form a first connection between the implement and the arm of the work vehicle. The second lock assembly includes a first pin, a second pin, and one or more second actuators configured to drive the first pin and the second pin laterally to engage the pair of openings formed in the implement to form a second connection between the implement and the frame of the work vehicle.

In one embodiment, a method includes positioning a laterally-extending bar of an implement adjacent to a latch of a first lock assembly associated with an arm of a work vehicle. The method also includes actuating a first actuator of the first lock assembly to drive rotation of the latch to engage the laterally-extending bar of the implement to form a first connection between the implement and the arm of the work vehicle. The method further includes aligning a first pin and a second pin of a second lock assembly associated with a frame of the work vehicle with respective openings of the implement. The method further includes actuating one or more second actuators to drive the first pin and the second pin laterally outwardly to engage the respective openings of the implement to form a second connection between the implement and the frame of the work vehicle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Certain embodiments disclosed herein relate generally to systems and methods for coupling an implement to a work vehicle. The systems and methods may efficiently form one or more connections between the implement and the work vehicle. For example, a first connection may be formed between the implement and work vehicle arms of the work vehicle via a first lock assembly, and a second connection may be formed between the implement and a frame of the work vehicle via a second lock assembly. The first lock assembly may include one or more locking actuators that drive one or more locks (e.g., one or more latches) to engage a first mounting portion (e.g., a laterally-extending bar) of the implement. The second lock assembly may include one or more locking actuators that drive one or more locks (e.g., one or more pins) to engage a second mounting portion (e.g., openings formed in rearward end portions of the implement arms) of the implement.

The second connection may be located within the frame of the work vehicle (e.g., between opposite lateral sides of the frame and/or between opposite lateral wheels or tracks of the work vehicle). The second connection may also be located at a vertical position that is low to the ground (e.g., vertically below a seat and/or a cab for an operator of the work vehicle; vertically aligned with the wheels or the tracks of the work vehicle). Due to the second connection, horizontal forces experienced by the implement are transferred directly to the frame of the work vehicle. Accordingly, a force rating of the implement may be increased (e.g., as compared to implements that are only connected to the work vehicle arms of the work vehicle).

The first connection and the second connection disclosed herein are designed to facilitate efficient coupling of the implement to the work vehicle. The features of the first connection disclosed herein are particularly useful for implements that may benefit from the additional support provided by the second connection to the frame of the work vehicle (e.g., for implements, such as dozer blades, that experience large horizontal forces). In particular, the features of the first connection enable the implement to be efficiently coupled to the work vehicle arms of the work vehicle, while also then facilitating positioning of the implement to be efficiently coupled to the frame of the work vehicle via the second connection.

Advantageously, the first connection and the second connection may be devoid of components that tip or that otherwise rely on tipping motions to couple the implement to the work vehicle. However, in some embodiments, the work vehicle may include other components (e.g., a third lock assembly) that are configured to engage corresponding mounting portions (e.g., corresponding receiver) of other implements via tipping motions to form at least one connection. Thus, the work vehicle may efficiently couple to some implements via the first connection and the second connection to carry out certain operations, and the work vehicle may couple to other implements via at least one different connection (e.g., via the third lock assembly) to carry out other operations.

Figure 1:
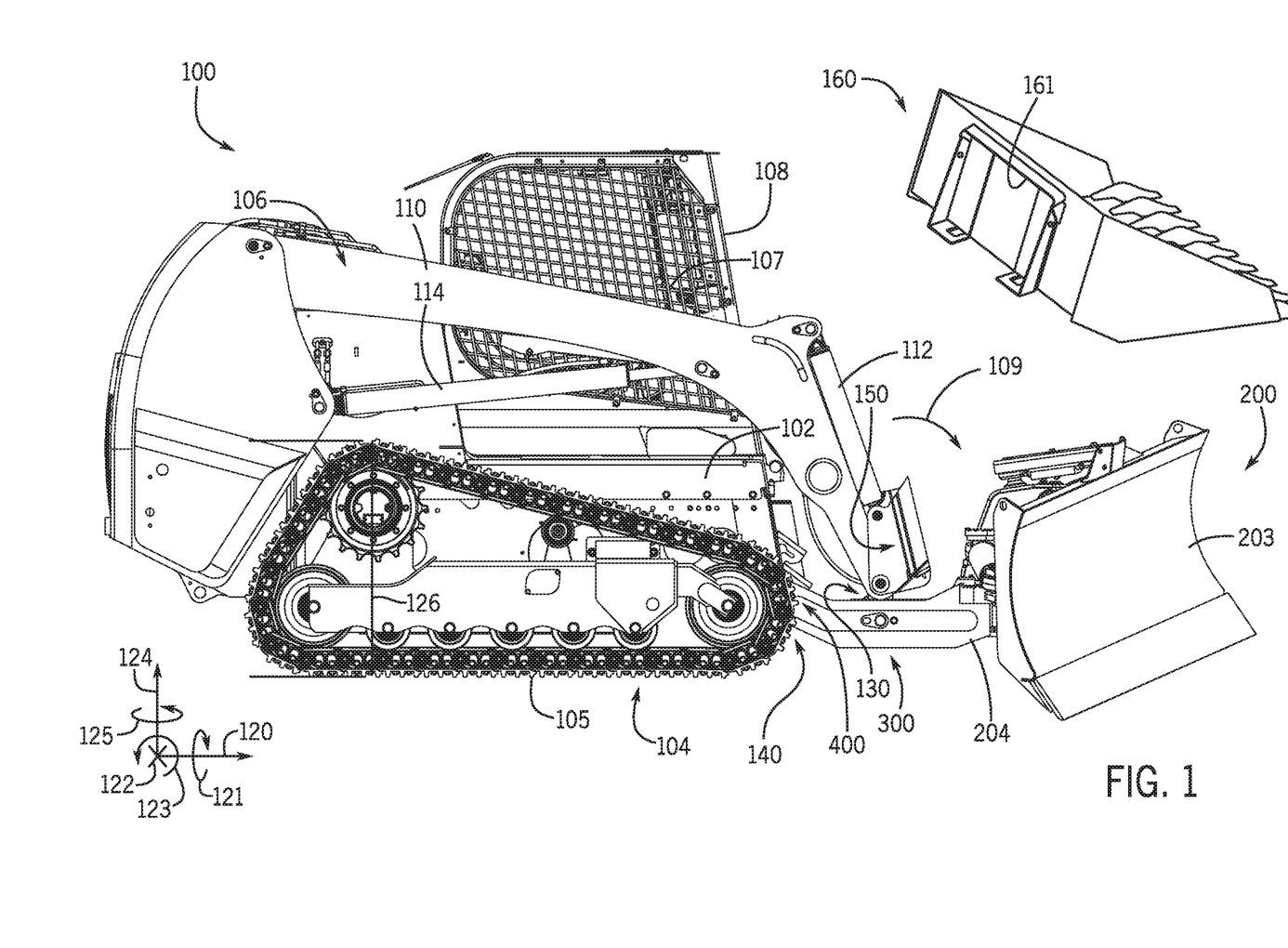
FIG. 1 is a side view of a work vehicle coupled to an implement, in accordance with an embodiment of the present disclosure.

Turning now to the drawings, FIG. 1A is a side view of a work vehicle 100 coupled to an implement 200, in accordance with an embodiment of the present disclosure. The work vehicle 100 has a frame 102 that is supported and moved by a drive system 104 that includes a rolling assembly 105 (e.g., tracks that rotate about wheels). It should be appreciated that the rolling assembly 105 may instead include multiple wheels that contact and roll along the ground.

A work vehicle arm assembly 106 includes an arrangement of structural members, as well as other components that enable the operator to manipulate the implement 200. For example, the work vehicle arm assembly 106 includes actuators that are controllable via one or more operator controls 107 (e.g., hand controller(s) or lever(s)) to manipulate the implement 200. The one or more operator controls 107 may also enable the operator to control movement (e.g., travel relative to the ground) of the work vehicle 100. The one or more operator controls 107 may be positioned within a cab of the work vehicle 100, and the cab may at least partially surround the operator during operation of the work vehicle 100. A door may provide operator ingress/egress to the cab, and a window or opening 108 may enable the operator to view the implement 200 and a work environment exterior to the work vehicle 100.

As shown, the implement 200 includes a working component 203 (e.g., blade), and the work vehicle arm assembly 106 includes work vehicle arms 110 that extend forward of the frame 102 of the work vehicle 100 and couple to the implement 200. In particular, the work vehicle arm assembly 106 may include one work vehicle arm 110 on each lateral side of the work vehicle 100. Each work vehicle arm 110 is coupled to and/or supports a lift actuator 114 configured to extend or contract to lift (e.g., vertically lift) the work vehicle arms 110 (and the implement 200, when the implement 200 is coupled to the work vehicle arms 110) relative to the work vehicle 100 and relative to the ground.

In FIG. 1, various axes and directions are illustrated to facilitate discussion and understanding of certain movements of the implement 200 and/or the work vehicle 100. For example, as shown, a longitudinal axis 120 corresponds to a forward direction of travel of the work vehicle 100. A rotational movement 121 of the implement 200 about the longitudinal axis 120 may be referred to as "tilt." A lateral axis 122 corresponds to a lateral or side direction with respect to the work vehicle 100. A rotational movement 123 of the implement 200 about the lateral axis 122 may be referred to as "pitch." A vertical axis 124 extends in a vertical direction with respect to the work vehicle 100. A rotational movement 125 of the implement 200 about the vertical axis 124 may be referred to as "yaw." In operation, the actuators that are coupled to and/or supported by the implement 200 may be coupled to hoses (e.g., hydraulic hoses) of the work vehicle 100, and hydraulic fluid may be provided through the hoses to the hydraulic cylinders to drive rotation of the implement 200 about the axes 120, 122, 124. The flow of the hydraulic fluid may be controlled via the one or more operator controls 107. For example, the implement 200 may be coupled to and/or support a tilt actuator that drives the rotational movement 121 of the implement 200, a pitch actuator that drives the rotational movement 123 of the implement 200, and/or a yaw actuator that drives the rotational movement 125 of the implement 200.

In the illustrated embodiment, the implement 200 is configured to couple to the work vehicle 100 to form two connections between the implement 200 and the work vehicle 100. As shown, the implement 200 includes implement arms 204 that extend rearward of the working component 203. In particular, the implement arms 204 include one implement arm 204 on each lateral side of the implement 200. A first connection 300 between the implement 200 and the work vehicle arms 110 of the work vehicle 100 may be formed via a first lock assembly 130, and a second connection 400 between the implement 200 and the frame 102 of the work vehicle 100 may be formed via a second lock assembly 140.

As discussed in more detail below, the first lock assembly 130 may include one or more locking actuators that drive one or more locks (e.g., one or more latches) to engage a first mounting portion (e.g., a laterally-extending bar) of the implement 200, and the second lock assembly 140 may include one or more locking actuators that drive one or more locks (e.g., one or more pins) to engage a second mounting portion (e.g., openings formed in rearward end portions of the implement arms 204) of the implement 200.

It should be appreciated that the implement 200 may be configured to couple to the work vehicle 100 to form only one connection (e.g., only the first connection 300). However, as discussed above, coupling the implement 200 to the work vehicle 100 via both the first connection 300 and the second connection 400 enables the work vehicle 100 to apply a larger force to the implement 200 and/or perform a greater amount of work with the implement 200 (e.g., as compared to an implement coupled to the work vehicle 100 via only the first connection 300 or other connection at the work vehicle arms 110).

As shown, the second connection 400 is located within the frame 102 of the work vehicle 100 (e.g., between opposite lateral sides of the frame 102 and/or between the rolling assemblies 105 of the work vehicle 100). The second connection 400 may also be located at a vertical position that is low to the ground (e.g., vertically below a seat and/or a cab for the operator of the work vehicle 100; vertically aligned with or within a vertical extent 126 of the rolling assemblies 105 of the work vehicle 100). Due to the second connection 400, horizontal forces experienced by the implement 200 are transferred directly to the frame 102 of the work vehicle 100.

The first connection 300 and the second connection 400 disclosed herein are designed to facilitate efficient coupling of the implement 200 to the work vehicle 100. The features of the first connection 300 disclosed herein are particularly useful for a type of the implement 200 that may benefit from the additional support provided by the second connection 400 to the frame 102 of the work vehicle 100. For example, the first connection 300 and the second connection 400 may be utilized for a blade (e.g., bulldozer blade). In some embodiments, the implement 200 is coupled to the work vehicle 100 only via the first connection 300 and/or the second connection 400.

In some embodiments, the work vehicle 100 may include other components that couple to other implements via a tipping motion. For example, the work vehicle 100 may include a third locking assembly 150 that is configured to couple to a corresponding mounting portion 161 of another implement 160 via a tipping motion to form a respective connection and to enable the work vehicle 100 to drive movement of the other implement 160. In particular, a tip cylinder 112 (e.g., tip actuator) may extend to tip the third locking assembly 150 in the direction of arrow 109 (e.g., rotational movement about the lateral axis 122) to engage the corresponding mounting portion 161 of the implement 160, and then the tip cylinder 112 may retract to couple the implement 160 to the work vehicle 100.

The implement 160 may be coupled to the work vehicle 100 only via the third lock assembly 150. However, in some embodiments, the implement 160 may include implement arms (e.g., similar to the implement arms 204 of the implement 200) and may also be coupled to the frame 102 (e.g., via the second lock assembly 140). While the tipping motion of the third locking assembly 150 may efficiently couple some implements (e.g., the implement 160 or implements that are not coupled to the frame 102 of the work vehicle 100) to the work vehicle 100, the third locking assembly 150 may make it difficult and/or time consuming to the position the implement 200 to efficiently couple the implement 200 to the frame 102 of the work vehicle 100.

In contrast, the first connection 300 and the second connection 400 may be devoid of components that tip or that otherwise rely on a tipping motion to couple the implement 200 to the work vehicle 100. Instead, the features of the first connection 300 enable the implement 200 to be efficiently coupled to the work vehicle arms 110 of the work vehicle 100, while also then facilitating positioning of the implement 200 to be efficiently coupled to the frame 102 of the work vehicle 100 via the second connection 400.

Thus, the work vehicle 100 may efficiently couple to some implements (e.g., the implement 200) via the first connection 300 alone or in combination with the second connection 400, and the work vehicle 100 may couple to other implements (e.g., the implement 160) via at least one different connection (e.g., via the third locking assembly 150 alone or in combination with the second locking assembly 140). The implement 200 may be any of a variety of implements, such as an asphalt miller, a bale spear, a barrier lift, a bucket, a backhoe, a cold planer, a concrete claw, demolition equipment, a dozer blade, a grapple bucket, a harley rake, a hydraulic brush cutter, a forestry mulcher, a pallet fork, a post driver, a rock saw, a root grapple, a rotary broom, a stump grinder, a tiller, a tree shear, a trench digger, or a vibratory roller, among others.

Figure 2:
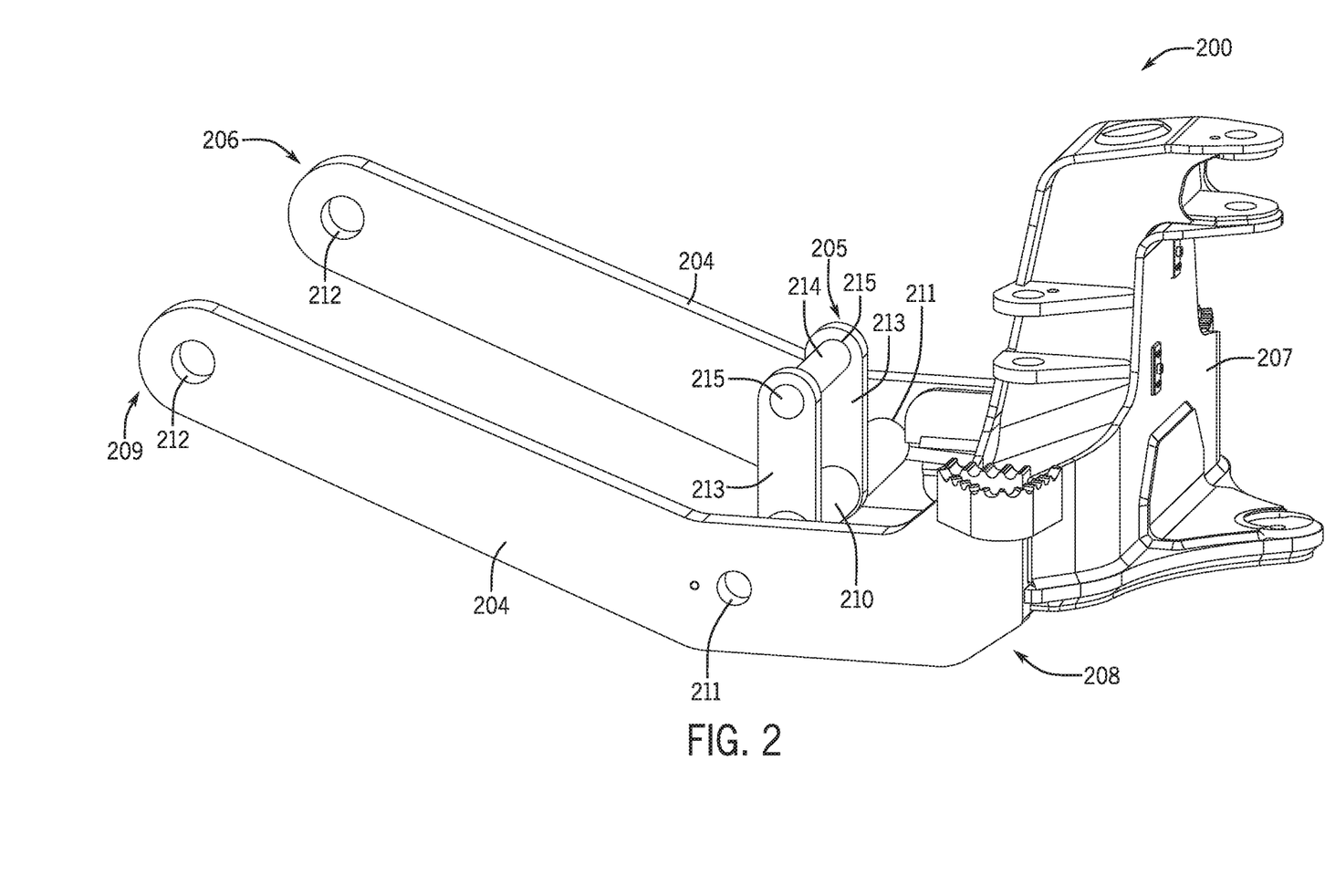
FIG. 2 is a front perspective view of a portion of the implement of FIG. 1, in accordance with an embodiment of the present disclosure.

FIG. 2 is a front perspective view of an embodiment of a portion of the implement 200 that may be coupled to the work vehicle 100. As shown, the implement 200 includes a connector 207 that is configured to couple to (e.g., via one or more fasteners, such as bolts) to the working component 203 (FIG. 1). The implement 200 also includes the implement arms 204 that extend between a first end portion 208 (e.g., forward end portion) and a second end portion 209 (e.g., rearward end portion). In the illustrated embodiment, a first mounting portion 205 includes a first bar 210 (e.g., laterally-extending bar or rod), brackets 213 (e.g., linkages), and a second bar 214 (e.g., laterally-extending bar or rod).

As shown, the first bar 210 extends between and contacts both of the implement arms 204. The implement arms 204 may include openings 211 (e.g., recess or through hole) that receive and support end portions of the first bar 210. Although not shown for image clarity, any suitable fastener (e.g., threaded nuts that thread onto ends of the first bar 210) may be utilized to couple the first bar 210 to the implement arms 204. The brackets 213 may extend cross-wise (e.g., orthogonal) to the first bar 210 and/or the second bar 214 and may couple the first bar 210 to the second bar 214. For example, the brackets 213 may include openings 215 (e.g., recess or through hold) that receive and support end portions of the second bar 214. The brackets 213 may be positioned laterally-inwardly relative to the implement arms 204, and a length of the first bar 210 (e.g., along the lateral axis 122) may be greater than a length of the second bar 214 (e.g., along the lateral axis 122).

It should be appreciated that some or all of the components of the first mounting portion 205 may be separate components that are coupled to one another, or some or all of the components of the first mounting portion 205 may be integrally-formed with one another (e.g., one-piece). For example, the brackets 213 may be integrally formed with the first bar 210 and/or the second bar 214. Furthermore, some or all of the components of the first mounting portion 205 may be separate components from the implement arms 204, or some or all of the components of the first mounting portion 205 may be integrally formed with the implement arms 204. For example, the first bar 210, the brackets 213, and/or the second bar 214 may be integrally formed with the implement arms 204. Additionally, the first mounting portion 205 may have any of a variety of other configurations, although preferably the first mounting portion 205 includes at least one laterally-extending bar (e.g., the first bar 210, the second bar 214) to facilitate coupling the implement 200 to the work vehicle 100 via the first lock assembly 130 (FIG. 1).

In the illustrated embodiment, a second mounting portion 206 includes openings 212 (e.g., recess or through hole) formed at the respective second end portion 209 of each implement arm 204. Each opening 212 is configured to receive a respective lock (e.g., pin) of the second locking assembly 140 to form the second connection 400 (FIG. 1).

Figure 3A:
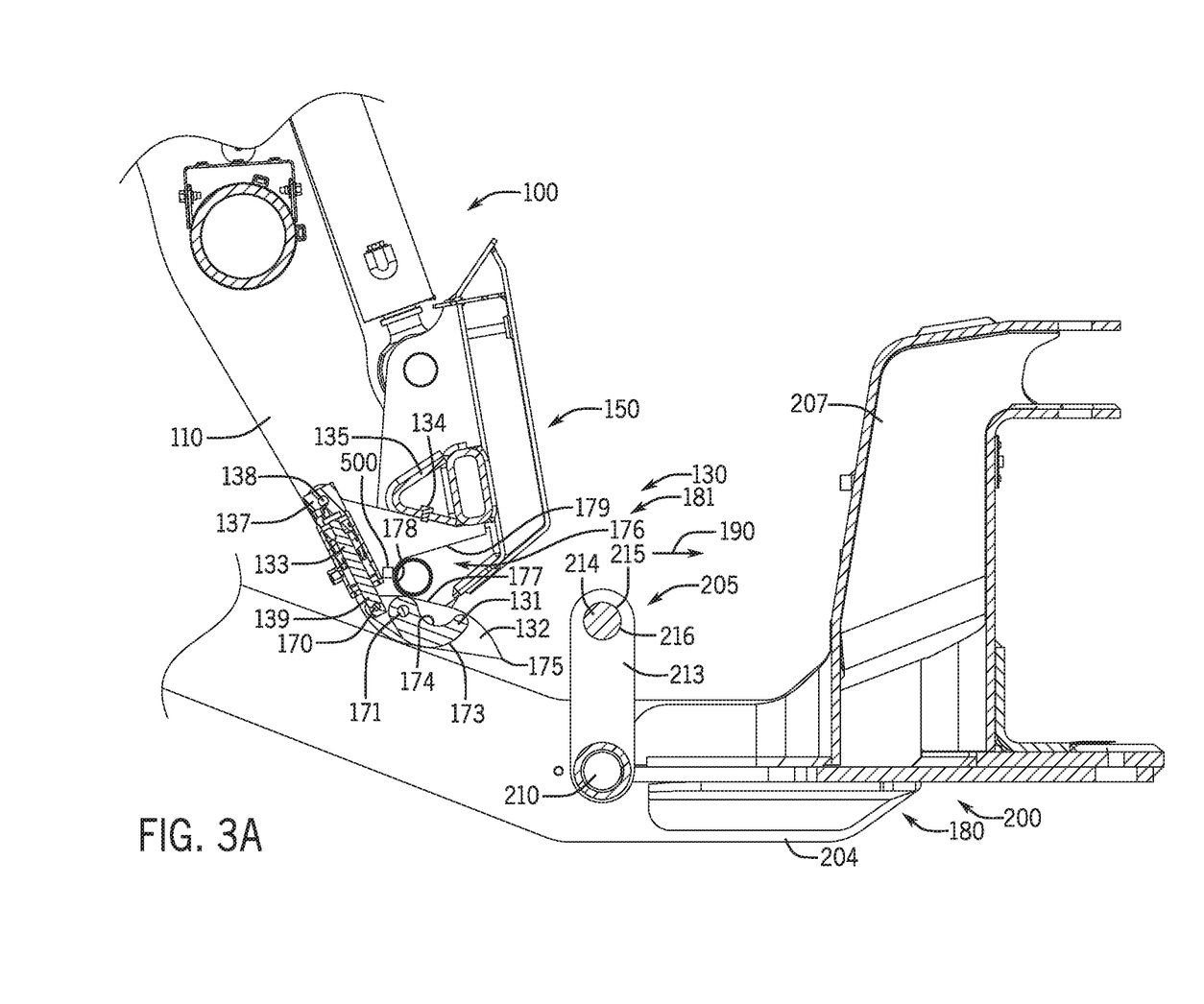
FIG. 3A is a side cross-sectional view of a portion of the work vehicle and a portion of the implement of FIG. 1 prior to being coupled to one another via a first lock assembly, in accordance with an embodiment of the present disclosure.
Figure 3B:
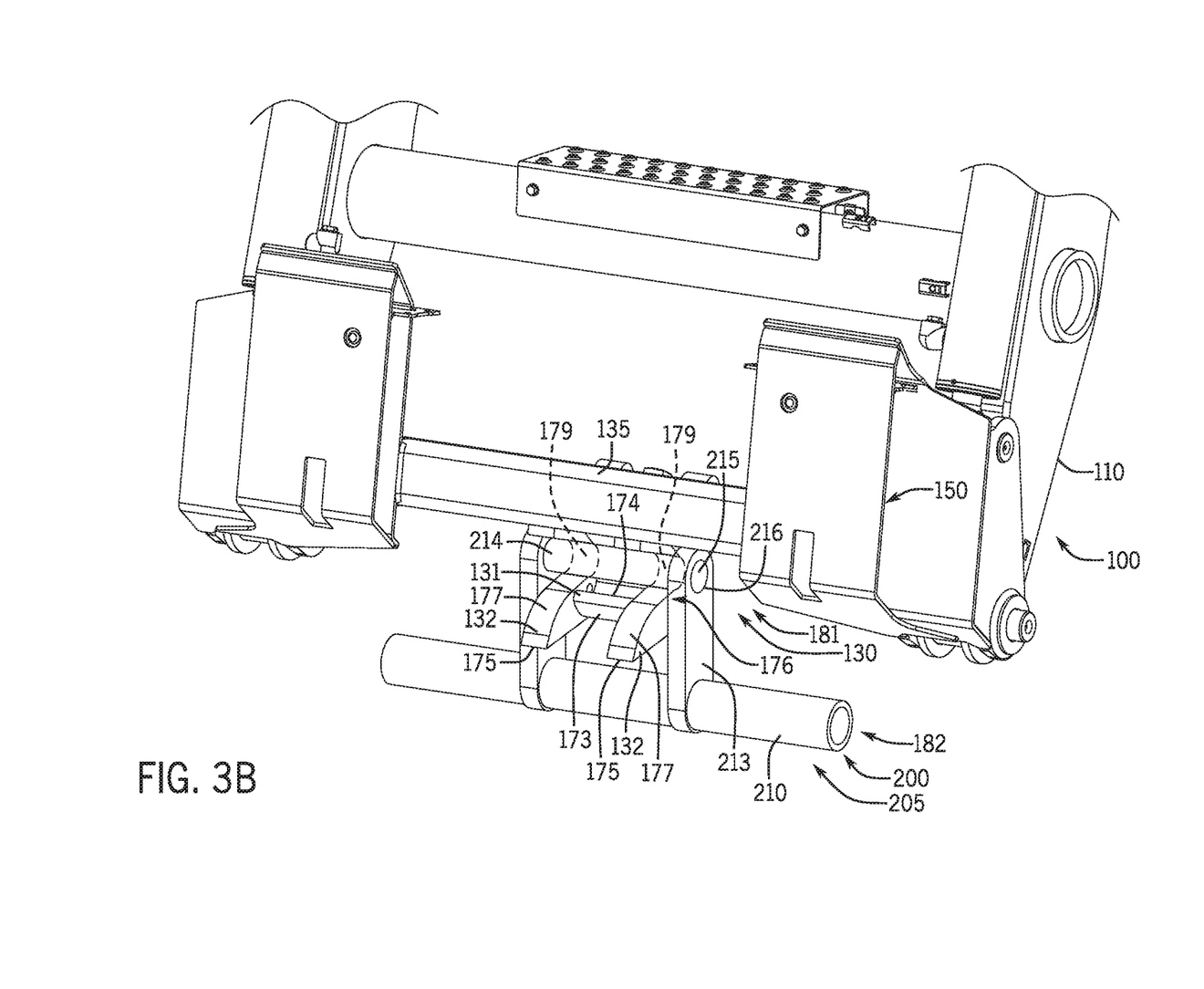
FIG. 3B is a front perspective view of a portion of the work vehicle and a portion of the implement of FIG. 1 in contact with one another prior to being coupled to one another via the first lock assembly, in accordance with an embodiment of the present disclosure.
Figure 3C:
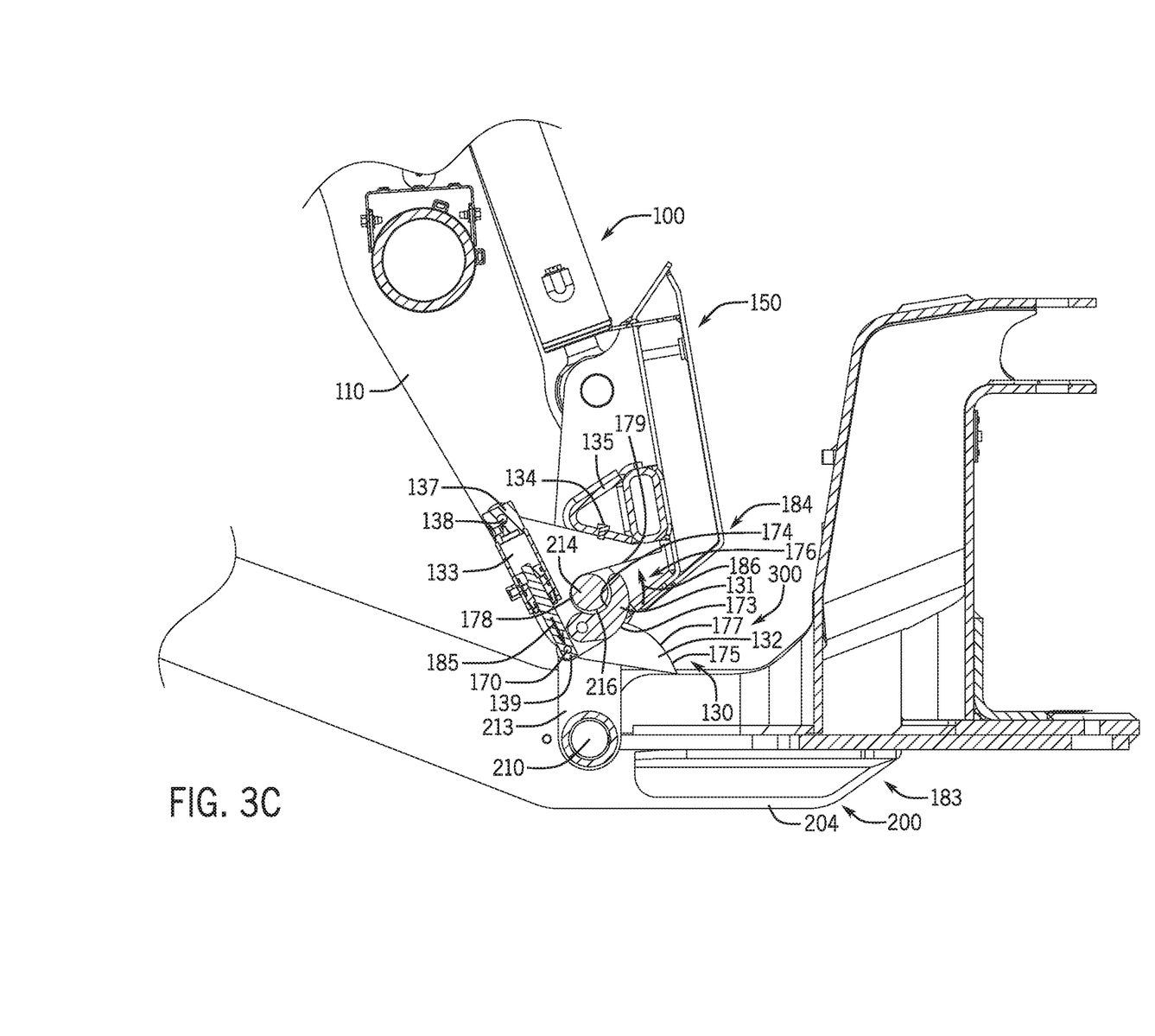
FIG. 3C is side cross-sectional view of a portion of the work vehicle and a portion of the implement of FIG. 1 coupled to one another via the first lock assembly, in accordance with an embodiment of the present disclosure.

FIG. 3A is a side cross-sectional view of a portion of the work vehicle 100 and a portion of the implement 200 prior to being coupled to one another via the first lock assembly 130. Additionally, FIG. 3B is a front perspective view of a portion of the work vehicle 100 and a portion of the implement 200 in contact with one another prior to being coupled to one another via the first lock assembly 130, and FIG. 3C is side cross-sectional view of a portion of the work vehicle 100 and a portion of the implement 200 coupled to one another via the first lock assembly 130. In FIG. 3A, the implement 200 is in an unattached position 180 and the first lock assembly 130 is in an unlocked position 181. In FIG.

3B, the implement 200 is in an engaged position 182 and the first lock assembly 130 is in the unlocked position 181. In FIG. 3C, the implement 200 is in an attached position 183 and the first lock assembly 130 is in a locked position 184 to form the first connection 300.

As shown in FIGS. 3A-3C, the first lock assembly 130 may include one or more locks 131 (e.g., one or more latches), one or more hooks 132 (e.g., one or more hooks), and/or one or more locking actuators 133. While the illustrated locking actuator 133 is a hydraulic actuator, it should be appreciated that pneumatic actuators and/or electric actuators may be utilized. The first lock assembly 130 may be coupled to the work vehicle arms 110 of the work vehicle 100 in any of a variety of ways. For example, the one or more hooks 132 may be coupled (e.g., non-rotatably coupled via one or more fasteners 134, such as bolts) to a support structure 135 that extends laterally between and is coupled to (e.g., non-rotatably coupled via one or more fasteners, such as bolts) to the work vehicle arms 110 of the work vehicle 100. In some embodiments, the one or more hooks 132 may be integrally formed with the support structure 135 or with another component associated with the work vehicle arms 110 of the work vehicle 100.

The one or more locking actuators 133 (e.g., respective first end portions 137 of the one or more locking actuators 133) may be coupled (e.g., non-rotatably coupled via one or more fasteners 138, such as bolts) to the hooks 132, to the support structure 135, or to some other component associated with the work vehicle arms 110 of the work vehicle 100. The one or more locking actuators 133 (e.g., respective second end portions 139 of the one or more locking actuators 133) may also be coupled (e.g., rotatably coupled via one or more fasteners 170, such as pins) to the one or more locks 131. Additionally, the one or more locks 131 may be coupled (e.g., rotatably coupled via one or more fasteners 171, such as pins) to the one or more hooks 132.

In the illustrated embodiment, one lock 131 and one locking actuator 133 are positioned between two hooks 132 along the lateral axis 122 (e.g., the hooks 132 are on opposite lateral sides of the lock 131). However, any suitable number of locks 131, hooks 132, and locking actuators 133 having any of the features disclosed herein may be provided. As shown, the lock 131 includes a generally curved outer surface 173 and a generally curved inner surface 174 to enable the lock 131 to engage and fit around the second bar 214 of the first mounting portion 205 of the implement 200. In some embodiments, a radius of curvature of the curved inner surface 174 may generally correspond to a radius of curvature of an outer surface 216 of the second bar 214 of the first mounting portion 205.

As shown, each of the hooks 132 include a first portion 175 that extends forward (e.g., relative to the forward direction of travel) of the lock 131, thereby shielding the lock 131 from impact with the first mounting portion 205 of the implement 200 as the work vehicle 100 approaches the implement 200, for example. Each of the hooks 132 may also include a groove 176 that is configured to receive the second bar 214 of the first mounting portion 205. As shown, the groove 176 of each of the hooks 132 is defined by a curved lower surface 177, a curved bar-contacting surface 178, and an upper surface 179. In some embodiments, a radius of curvature of the curved bar-contacting surface 178 may generally correspond to the radius of curvature of the outer surface 216 of the second bar 214 of the first mounting portion 205. The groove 176, and also the shape of the curved lower surface 177, may guide the second bar 214 of the first mounting portion 205 into a position that enables the actuation of the lock 131 to secure the second bar 214 of the first mounting portion 205 to form the first connection 300.

In operation, to transition from the unattached position 180 of FIG. 3A to the attached position 183 of FIG. 3C, the operator may manipulate the work vehicle 100 and/or the implement 200 to align (e.g., along the longitudinal axis 120, the lateral axis 122, and the vertical axis 124) the lock 131 with the second bar 214 of the first mounting portion 205 of the implement 200. The operator may align the lock 131 with the second bar 214 of the first mounting portion 205 of the implement 200 in any of a variety of ways, including manually moving the implement 200, driving the work vehicle 100 toward the implement 200, and/or adjusting the work vehicle arms 110 (e.g., via the lift actuator 114 [FIG. 1]) until the lock 131 aligns with the second bar 214.

For example, the implement 200 may be coupled to the work vehicle 100 by positioning the first lock assembly 130 in the unlocked position 181 and driving the work vehicle 100 toward the implement 200, as shown by arrow 190 in FIG. 3A. As shown, in the unlocked position 181, the locking actuator 133 is in a first position (e.g., retracted position) and the lock 131 is in an open position (e.g., lowered position). As the work vehicle 100 drives toward the implement 200, the second bar 214 of the first mounting portion 205 may be received within and/or may be guided into the groove 176 of the hooks 132 until the implement 200 reaches the engaged position 182 shown in FIG. 3B. In the engaged position 182, the second bar 214 of the first mounting portion 205 may contact the curved bar-contacting surface 178 of the hooks 132.

Once the implement 200 reaches the engaged position 182, the first lock assembly 130 may be adjusted to move to the locked position 184. As shown, in the locked position 184, the locking actuator 133 is in a second position (e.g., extended position) and the lock 131 is in a closed position (e.g., raised position). To reach the locked position 184, the locking actuator 133 may be actuated by providing a fluid (e.g., a hydraulic fluid from a hydraulic fluid source) to one or more chambers to drive a piston rod (e.g., movable rod) coupled to the lock 131 in the direction of arrow 185. The actuation of the locking actuator 133 causes the lock 131 to rotate (e.g., upwardly, about the lateral axis 122) as shown by arrow 186 to close about and/or trap the second bar 214 of the first mounting portion 205 between the curved bar-contacting surface 178 of the hooks 132 and the curved inner surface 174 of the lock 131. In the illustrated embodiment, the locking actuator 133 is hydraulically-actuated with one or more chambers that are configured to receive a fluid from a fluid source and a piston rod (e.g., movable rod) that is coupled to the lock 131. However, the locking actuator 133 may have any of a variety of forms to drive the lock 131. Additionally, the operator may provide an input to actuate the locking actuator 133 via the one or more operator controls 107 (FIG. 1) or other operator controls (e.g., located outside of the cab, on the first lock assembly 130, and/or on the work vehicle arms 110).

In this way, the implement 200 may reach the attached position 183 of FIG. 3C. In the attached position 183, the second bar 214 is supported (e.g., from underneath) by the curved lower surface 177 of the groove 176 of the hooks 132 and also by the inner surface 174 of the lock 131. In the attached position 183, the first mounting portion 205 and the implement 200 may be able to rotate relative to the first lock assembly 130 and relative to the work vehicle 100. For example, the second bar 214 may rotate within the space between the curved bar-contacting surface 178 of the hooks 132 and the curved inner surface 174 of the lock 131.

Additionally, as shown in FIGS. 3A-3B, the work vehicle 100 may include the optional third locking assembly 150.

Figure 4:
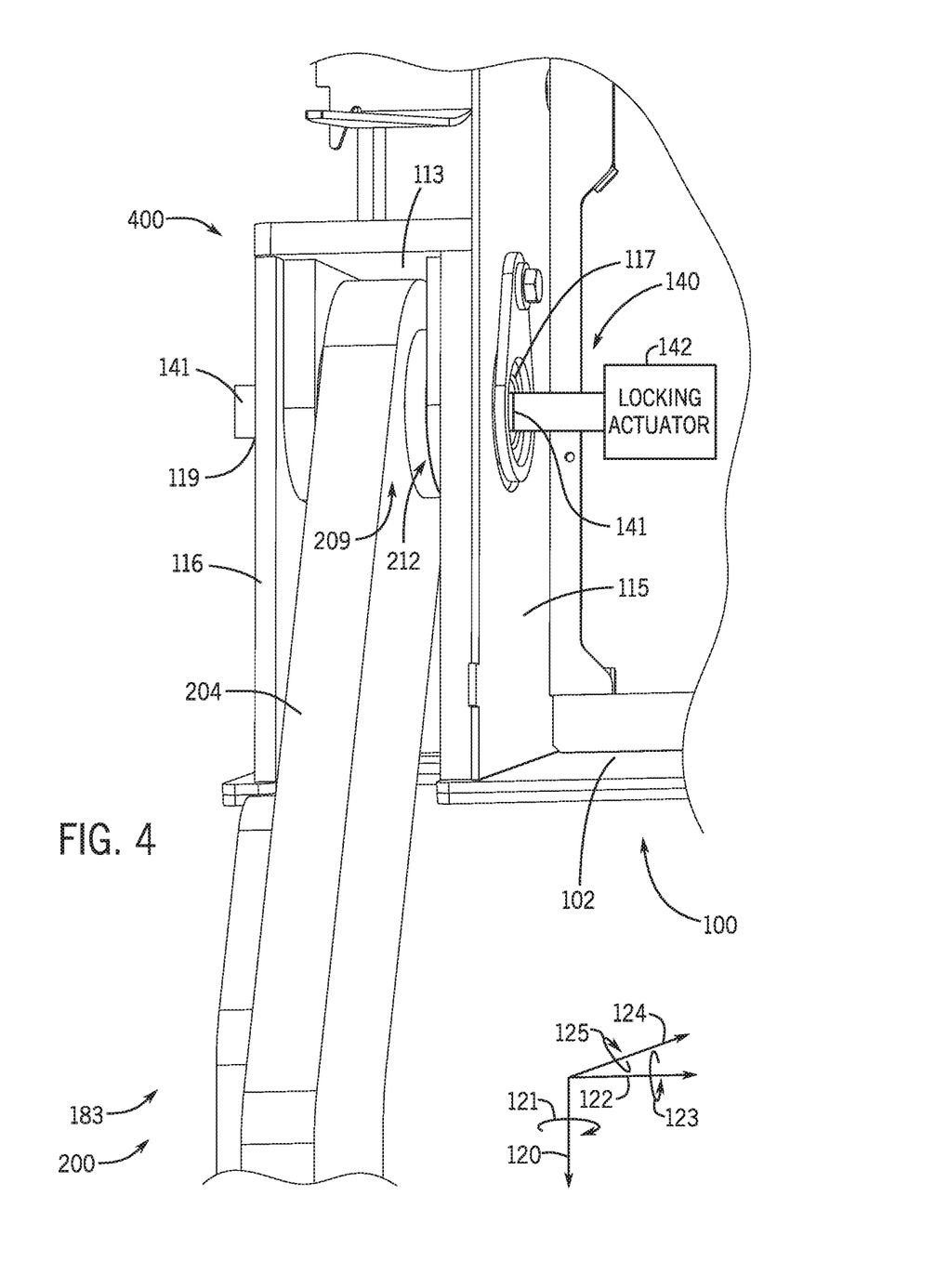
FIG. 4 a bottom view of a portion of the work vehicle and a portion of the implement of FIG. 1 coupled to one another via a second lock assembly, in accordance with an embodiment of the present disclosure.

FIG. 4 a bottom view of a portion of the work vehicle 100 and a portion of the implement 200 coupled to one another via the second lock assembly 140. While only one side (e.g., a left hand side during travel of the work vehicle 100) is shown to facilitate discussion, it should be appreciated that the same components may be provided on the other side of the work vehicle 100 (e.g., a right hand side).

As shown, a lock 141 (e.g., pin) extends laterally through the opening 212 formed at the second end portion 209 of the implement arm 204. The lock 141 may be driven by a locking actuator 142 that is coupled to (e.g., via one or more fasteners, such as bolts) or otherwise supported by the frame 102 of the work vehicle 100. To facilitate discussion, the locking actuator 142 is illustrated schematically, as various different types of actuators (e.g., hydraulic actuators, pneumatic actuators, electric actuators) may be used to drive the lock 141 laterally (e.g., laterally-outwardly) through the opening 212.

In the illustrated embodiment, the second end portion 209 of the implement arms 204 is positioned within a receptacle 113 formed between a laterally-inner wall 115 and a laterally-outer wall 116 of the frame 102 of the work vehicle 100. In some such embodiments, the lock 141 may extend through an opening 117 (e.g., through hole) in the laterally-inner wall 115 of the frame 102 of the work vehicle 100, through the opening 212 in the implement arm 204, and into or through an opening 119 (e.g., recess or through hole) formed in the laterally-outer wall 116 of the frame 102 of the work vehicle 100. As noted above, it should be appreciated that another lock 141 may be provided on the opposite lateral side of work vehicle 100 to engage the opening 212 in the implement arm 204 on the opposite lateral side of the implement 200. These locks 141 may both be driven by the locking actuator 142 (e.g., double rod cylinder) or by separate actuators (e.g., the locking actuator 142 and another locking actuator). In FIGS. 3C and 4, the implement 200 is in the attached position 183 in which the locks 131 engage the second bar 214 of the first mounting portion 205 of the implement 200 and the locks 141 engage the openings 212 of the implement arms 204 of the implement 200 to enable the work vehicle 100 to manipulate the implement 200.

Figure 5:
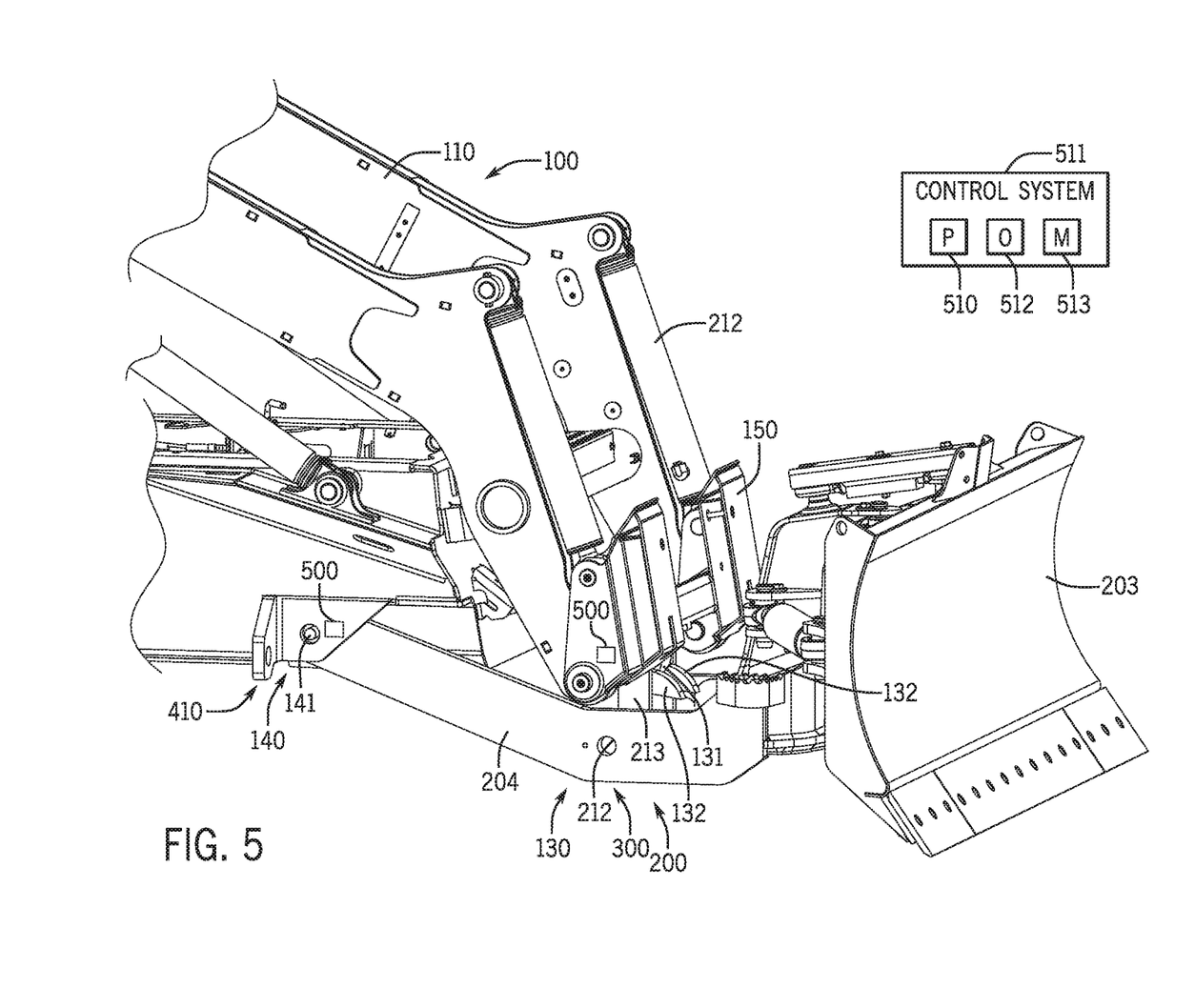
FIG. 5 is a front perspective view of a portion of the work vehicle and the implement of FIG. 1 coupled to one another via the first lock assembly and the second lock assembly, in accordance with an embodiment of the present disclosure.

FIG. 5 is a front perspective view of a portion of the work vehicle 100 and the implement 200 coupled to one another via the first lock assembly 130 and the second lock assembly 140. As shown, the lock 131 of the first lock assembly 130 is in the closed position to wrap around and secure the second bar 214 (FIG. 2) of the implement 200, and the locks 141 of the second lock assembly 140 engage the openings 212 (FIG. 2) of the implement arm 204 of the implement 200.

As noted above, the first connection 300 and the second connection 400 may formed in any of a variety of ways. Furthermore, the first connection 300 and the second connection 400 may made simultaneously or sequentially. For example, the implement 200 and the work vehicle 100 may be positioned to align the lock 131 of the first lock assembly 130 with the second bar 214, and then the locking actuator 133 of the first lock assembly 130 may be actuated to adjust the lock 131 to form the first connection 300. Subsequently, the lift actuator 114 may be actuated to cause the implement 200 to rotate relative to the work vehicle 100 and/or to cause at least part of the implement 200 to raise off of the ground until the locks 141 of the second lock assembly 140 align with the openings 212. Once aligned, the locking actuator 142 of the second lock assembly 140 may be actuated to adjust the locks 141 to form the second connection 400. In other embodiments, the second connection 400 may be formed prior to the first connection 300.

In some embodiments, to facilitate the process of coupling the implement 200 to the work vehicle 100, the work vehicle 100 may include one or more sensors. For example, the work vehicle 100 may include one or more sensors 500 that detect and output signals that indicate that the lock 131 aligns with the second bar 214 and/or that the locks 141 aligns with the openings 212. Additionally or alternatively, the locking actuators 133, 142 may output signals that indicate a position of the locks 131, 141 (e.g., open position or closed positioned; retracted position or extended position).

The sensors 500 are illustrated schematically near the first and second lock assemblies 130, 140; however, the sensors 500 may be positioned at any suitable location that enables the sensors 500 to monitor the alignment between the lock 131 and the second bar 214 and/or between the locks 141 and the openings 212. For example, with reference to FIG. 3A, at least one sensor 500 may be positioned along the curved bar-contacting surface 178 of the groove 176 of one or more of the hooks 132 to detect contact between the second bar 214 and the curved bar-contacting surface 178. This contact indicates that the implement 200 is in the engaged position 182 of FIG. 3B and that the locking actuator 133 may be actuated to adjust the lock 131 to secure the second bar 214.

The signals output by the sensors 500 and/or the locking actuators 133, 142 may be processed by a processor 510 of a control system 511 (e.g., electronic control system) of the work vehicle 100. The processor 510 may instruct an output device 512 (e.g., display, speaker) within the cab to provide an indication (e.g., text message, visual signal or symbol, audible alarm) of the respective positions of the components (e.g., the alignment between the lock 131 and the second bar 214; the alignment between the locks 141 and the openings 212; that the lock 131 is in the closed position about the second bar 214; that the locks 141 are extended to engage the openings 212). Thus, the operator may actuate the first lock assembly 130 and/or the second lock assembly 140 (e.g., via the operator controls 107) at an appropriate time and/or receive confirmation that the implement 200 is coupled to the work vehicle 100. In some embodiments, some or all of the process to couple the implement 200 to the work vehicle 100 may be automated. For example, the processor 510 may provide a control signal (e.g., to valves to release fluid from the fluid source) to adjust the locking actuators 133, 142 in response to the signals received from the sensors 500 indicating that the locks 131, 141 are aligned with the respective mounting portion 205, 206 of the implement 200. The processor 510 may also be configured to control other aspects of the work vehicle 100, such as various other actuators (e.g., the tip cylinder 112, the lift actuator 114). The sensors 500 may include, for example, inductive proximity sensors, capacitive proximity sensors, optical sensors, or any other type of sensor capable of detecting alignment of the components.

In the illustrated embodiment, the control system 511 includes the processor 510 and a memory device 513. The control system 511 may also include one or more storage devices and/or other suitable components. The processor 510 may be used to execute software, such as software for controlling the automated coupling process, and so forth. Moreover, the processor 510 may include multiple microprocessors, one or more "general-purpose" microprocessors, one or more special-purpose microprocessors, and/or one or more application specific integrated circuits (ASICS), or some combination thereof. For example, the processor 510 may include one or more reduced instruction set (RISC) processors.

The memory device 513 may include a volatile memory, such as random access memory (RAM), and/or a nonvolatile memory, such as read-only memory (ROM). The memory device 513 may store a variety of information and may be used for various purposes. For example, the memory device 513 may store processor-executable instructions (e.g., firmware or software) for the processor 510 to execute, such as instructions for controlling the work vehicle or controlling the automated coupling process. The storage device(s) (e.g., nonvolatile storage) may include ROM, flash memory, a hard drive, or any other suitable optical, magnetic, or solid-state storage medium, or a combination thereof. The storage device(s) may store data, such as measurements and/or configurations of the implement 200 to assist with controlling the automated coupling process.

Figure 6:
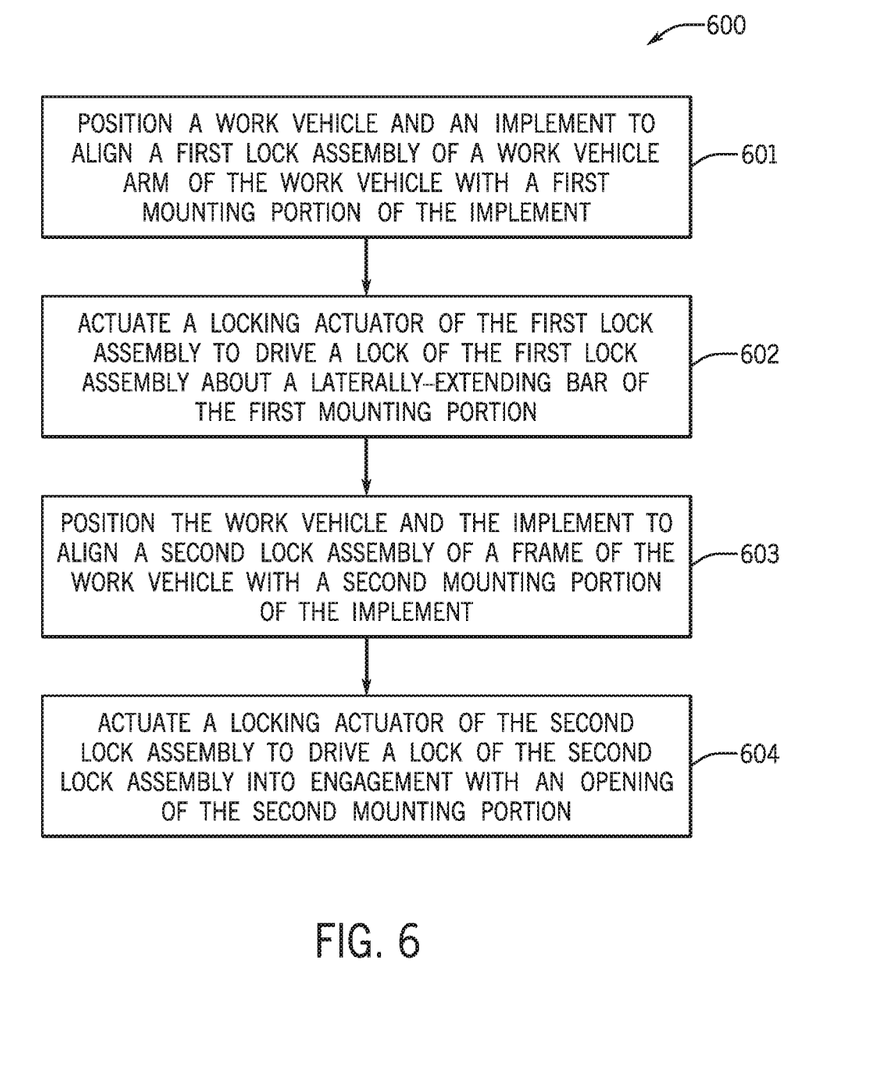
FIG. 6 is a flow diagram of a method for coupling the work vehicle and the implement of FIG. 1, in accordance with an embodiment of the present disclosure.

FIG. 6 is a flow diagram of an embodiment of a method 600 for coupling the work vehicle 100 to the implement 200. In step 601, the operator may position the work vehicle 100 and the implement 200 to align the first lock assembly 130 with the first mounting portion 205 of the implement 200. In particular, the operator may position the work vehicle 100 and the implement 200 to place the second bar 214 within the groove 176 of the hooks 132. The operator may accomplish this by manually moving the implement 200, driving the work vehicle 100 toward the implement 200, and/or adjusting the work vehicle arms 110 until the second bar 214 is positioned within the groove 176 of the hooks 132.

In step 602, once the first lock assembly 130 is aligned with the first mounting portion 205, the operator may instruct actuation of the locking actuator 133 of the first lock assembly 130. As noted above, the operator may instruct actuation by providing an input to adjust the locking actuator 133 via the one or more operator controls 107 (FIG. 1). Upon the input at the one or more operator controls 107, the processor 510 may control a valve to release the fluid from the fluid source to the locking actuator 133, and the fluid may then drive the lock 131 to rotate upwardly to secure the second bar 214 between the curved bar-contacting surface 178 of the groove 176 of the hooks 132 and the inner surface 174 of the lock 131.

In step 603, the operator may position the work vehicle 100 and the implement 200 to align the second lock assembly 140 of the frame 102 of the work vehicle 100 with the second mounting portion 206 of the implement 200. In particular, the operator may position the work vehicle 100 and the implement 200 to align the locks 141 with the openings 212 of the implement 200. The operator may align the locks 141 with the openings 212 in any of a variety of ways, including manually moving the implement 200, driving the work vehicle 100 toward the implement 200, and/or adjusting the work vehicle arms 110 until the locks 141 align with the openings 212.

In step 604, once the locks 141 align with the openings 212, the operator may instruct actuation of the locking actuator 142 of the second lock assembly 140. As noted above, the operator may instruct actuation by providing an input to adjust the locking actuator 142 via the one or more operator controls 107 (FIG. 1). Upon the input at the one or more operator controls 107, the processor 510 may control a valve to release the fluid from the fluid source to the locking actuator 142, and the fluid may then drive the locks 141 laterally outwardly away from one another to engage the openings 212.

As noted above, in embodiments in which both the first lock assembly 130 and the second lock assembly 140 are employed to attach the implement 200 to the work vehicle 100, the first lock assembly 130 and the second lock assembly 140 may be actuated simultaneously or sequentially. Furthermore, portions of the method 600 may be automated and/or performed in response to signals output by the sensors 500 and/or by the locking actuators 133, 142.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system configured to couple an implement to a work vehicle that includes a drive system with a rolling assembly to travel along ground, comprising:
   a first lock assembly coupled to an arm of the work vehicle, wherein the first lock assembly comprises:
      a latch;
      a first hook and a second hook positioned on opposite lateral sides of the latch and non-rotatably coupled to the arm of the work vehicle via a support structure; and
      a first actuator configured to drive rotation of the latch to trap a laterally-extending bar of the implement between a curved inner surface of the latch and respective curved bar-contacting surfaces of the first and second hooks to form a first connection that couples the implement to the work vehicle; and
   a second lock assembly coupled to a frame of the work vehicle, wherein the second lock assembly comprises:
      a first pin;
      a second pin; and
      one or more second actuators configured to drive the first pin and the second pin laterally to engage respective openings formed in the implement to form a second connection that couples the implement to the work vehicle.

2. The system of claim 1, wherein the first actuator is configured to drive the rotation of the latch relative to the first and second hooks to trap the laterally-extending bar.

3. The system of claim 1, comprising a controller configured to receive one or more signals indicative of a position of the laterally-extending bar from one or more sensors, and to instruct the first actuator to drive the rotation of the latch to trap the laterally-extending bar when the one or more signals indicate that the laterally-extending bar of the implement is positioned against the respective curved bar-contacting surfaces of the first and second hooks.

4. The system of claim 1, wherein the first connection is configured to enable the implement to rotate relative to the work vehicle.

5. The system of claim 1, comprising a third lock assembly coupled to the arm of the work vehicle, wherein the third lock assembly is configured to engage a corresponding mounting portion of another implement via a tipping motion to form a respective connection between the another implement and the work vehicle.

6. The system of claim 1, wherein the work vehicle comprises a tractor or a skid steer.

7. The system of claim 1, wherein the implement comprises an asphalt miller, a bale spear, a barrier lift, a bucket, a backhoe, a cold planer, a concrete claw, demolition equipment, a dozer blade, a grapple bucket, a harley rake, a hydraulic brush cutter, a forestry mulcher, a pallet fork, a post driver, a rock saw, a root grapple, a rotary broom, a stump grinder, a tiller, a tree shear, a trench digger, or a vibratory roller.

8. The system of claim 1, wherein the first actuator comprises a hydraulic actuator, a pneumatic actuator, or an electric actuator.

9. A system, comprising:
an implement comprising:
a pair of implement arms;
a first mounting portion that extends between and contacts the pair of implement arms, wherein the first mounting portion comprises a laterally-extending bar; and
a second mounting portion comprising a pair of openings formed in the pair of implement arms; and
a work vehicle comprising:
a first lock assembly coupled to an arm of the work vehicle, wherein the first lock assembly comprises a latch and a first actuator configured to drive rotation of the latch to engage the laterally-extending bar of the implement to form a first connection between the implement and the arm of the work vehicle; and
a second lock assembly coupled to a frame of the work vehicle rearward of the first lock assembly relative to a forward direction of travel of the work vehicle, wherein the second lock assembly comprises a first pin, a second pin, and one or more second actuators configured to drive the first pin and the second pin laterally to engage the pair of openings of the implement to form a second connection between the implement and the frame of the work vehicle.

10. The system of claim 9, wherein the implement comprises a dozer blade.

11. The system of claim 9, wherein the first lock assembly comprises hooks on opposite lateral sides of the latch, and the hooks define grooves that receive and support the laterally-extending bar of the implement.

12. The system of claim 11, wherein the first actuator is configured to drive the rotation of the latch relative to the hooks to trap the laterally-extending bar between respective curved bar-contacting surfaces of the grooves of the hooks and a curved inner surface of the latch.

13. The system of claim 9, wherein the rotation of the latch is upward relative to a ground on which the work vehicle and the implement are positioned.

14. The system of claim 9, wherein the implement is configured to rotate relative to the work vehicle at the first connection.

15. The system of claim 9, wherein the work vehicle comprises a third lock assembly coupled to the arm of the work vehicle, the implement is isolated from the third lock assembly when the implement is coupled to the work vehicle via the first and second connections, and the first and second connections enable the work vehicle to drive movement of the implement.

16. The system of claim 15, comprising another implement, wherein the third lock assembly is configured to engage a corresponding mounting portion of the another implement via a tipping motion to form a third connection that enables the work vehicle to drive movement of the another implement.

17. A method, comprising:
positioning a laterally-extending bar of an implement adjacent to a latch of a first lock assembly associated with an arm of a work vehicle;
while positioning the laterally-extending bar adjacent to the latch, actuating a first actuator of the first lock assembly to drive rotation of the latch to engage the laterally-extending bar of the implement to form a first connection between the implement and the arm of the work vehicle;
subsequently aligning a first pin and a second pin of a second lock assembly associated with a frame of the work vehicle with respective openings of the implement; and
while aligning the first pin and the second pin with the frame, actuating one or more second actuators to drive the first pin and the second pin laterally to engage the respective openings of the implement to form a second connection between the implement and the frame of the work vehicle.

18. The method of claim 17, comprising:
receiving, at a controller, one or more signals indicative of a position of the laterally-extending bar of the implement relative to the latch of the first lock assembly from one or more sensors; and
instructing, using the controller, the first actuator to drive the rotation of the latch to engage the laterally-extending bar of the implement in response to the one or more signals indicating that the laterally-extending bar of the implement is positioned within a groove of a hook of the first lock assembly.

19. The method of claim 18, wherein subsequently aligning the first pin and the second pin of the second lock assembly with the respective openings comprises lifting the implement via the arm of the work vehicle to cause the implement to rotate about the first connection to align the first pin and the second pin of the second lock assembly with the respective openings of the implement.

* * * * *